No. 834,046. PATENTED OCT. 23, 1906.
D. CAVE.
CONVEYING OR FORWARDING MECHANISM FOR HARVESTING MACHINES, &c.
APPLICATION FILED OCT. 22, 1904.
4 SHEETS—SHEET 1.
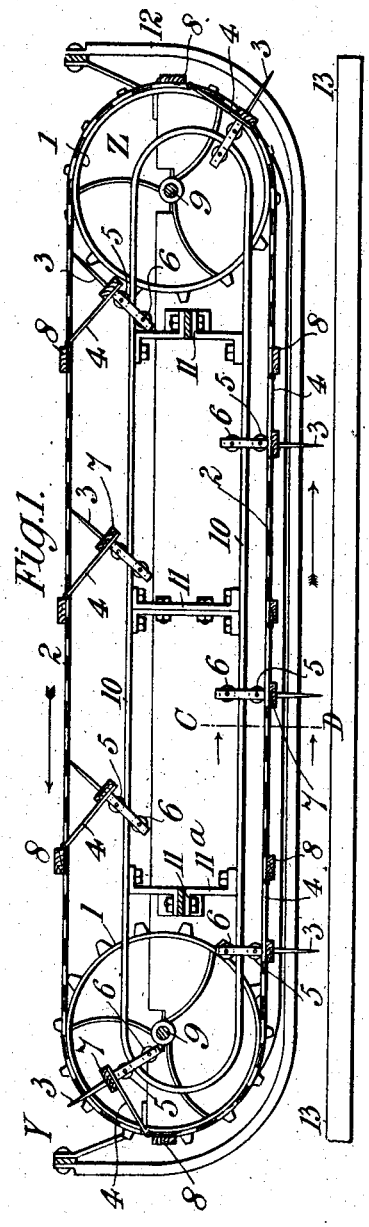
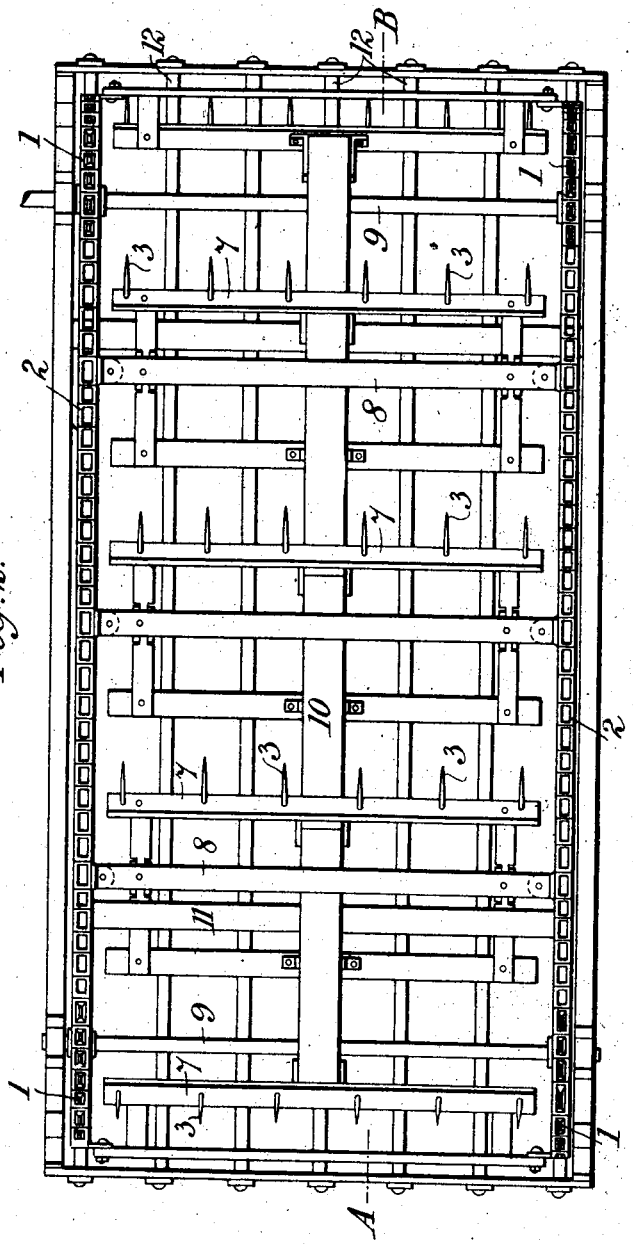
WITNESSES:
INVENTOR
David Cave
BY
ATTORNEYS.

No. 834,046.
PATENTED OCT. 23, 1906.
D. CAVE.
CONVEYING OR FORWARDING MECHANISM FOR HARVESTING MACHINES, &c.
APPLICATION FILED OCT. 22, 1904.
4 SHEETS—SHEET 2.
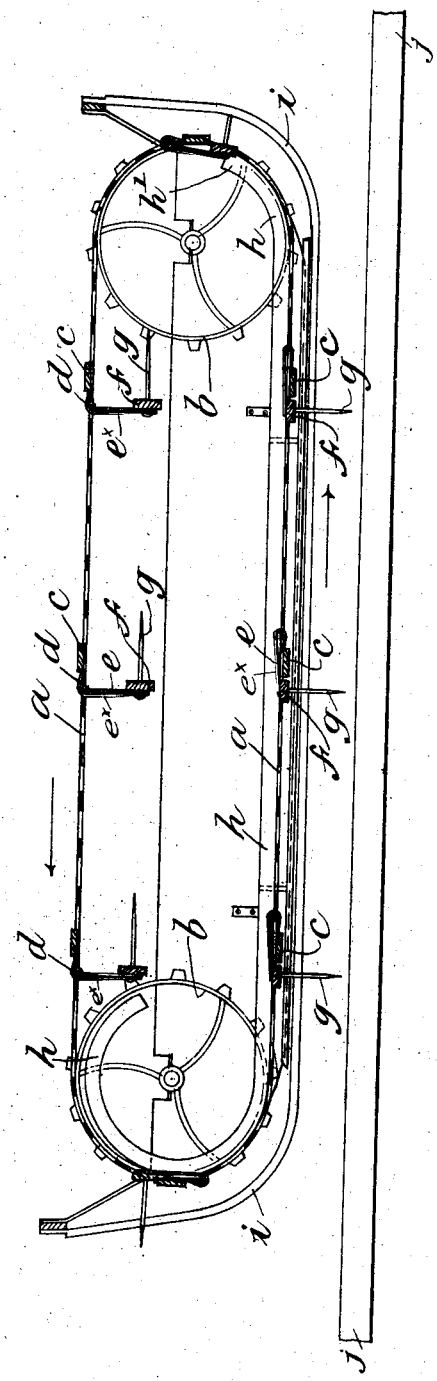

No. 834,046. PATENTED OCT. 23, 1906.
D. CAVE.
CONVEYING OR FORWARDING MECHANISM FOR HARVESTING MACHINES, &c.
APPLICATION FILED OCT. 22, 1904.
4 SHEETS—SHEET 3.
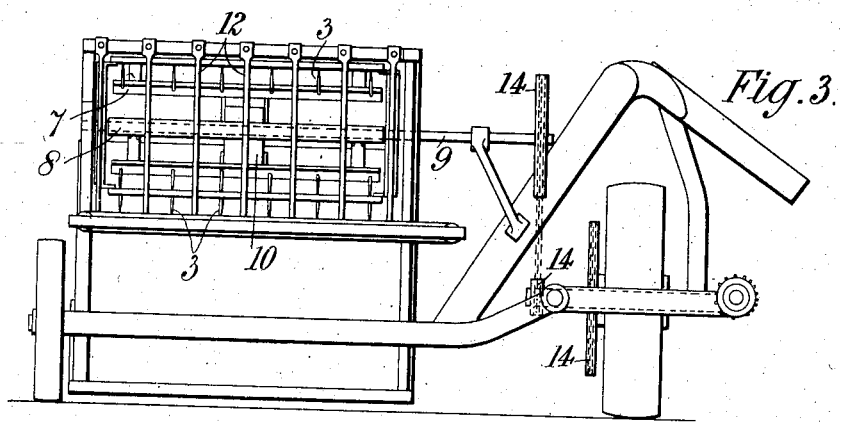
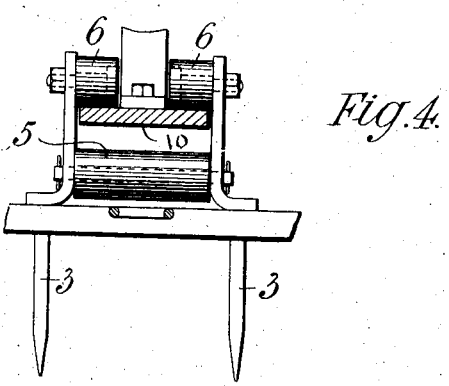
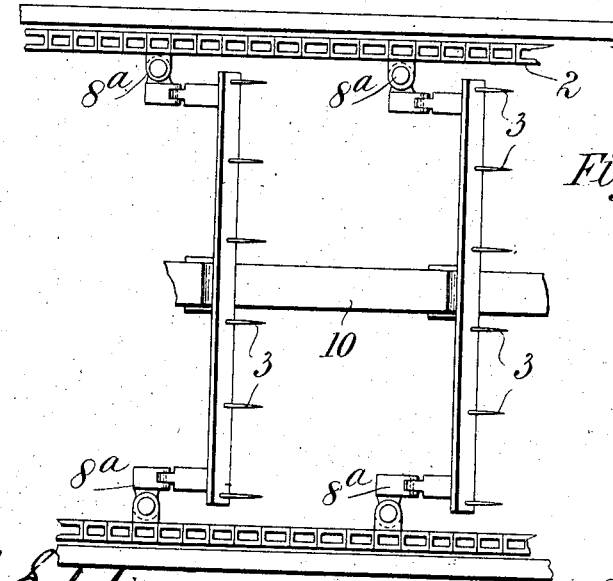
WITNESSES:
INVENTOR
David Cave
BY
ATTORNEYS.

No. 834,046. PATENTED OCT. 23, 1906.
D. CAVE.
CONVEYING OR FORWARDING MECHANISM FOR HARVESTING MACHINES, &c.
APPLICATION FILED OCT. 22, 1904.

4 SHEETS—SHEET 4.

WITNESSES:

INVENTOR
David Cave
BY
ATTORNEYS

UNITED STATES PATENT OFFICE.

DAVID CAVE, OF BICESTER, ENGLAND.

CONVEYING OR FORWARDING MECHANISM FOR HARVESTING-MACHINES, &c.

No. 834,046.      Specification of Letters Patent.      Patented Oct. 23, 1906.

Application filed October 22, 1904. Serial No. 229,607.

*To all whom it may concern:*

Be it known that I, DAVID CAVE, a subject of the King of Great Britain, residing in Bicester, Oxon, England, have invented certain new and useful Improvements in Conveying Mechanism for Harvesters and the Like, of which the following is a specification.

This invention consists of improvements in or relating to conveying or forwarding mechanism for use in harvesting-machines, swath-turning machines, hay-loading machines, side-delivery horse-rakes, elevating-machines, or the like, and relates more particularly to arranging and mounting the rake-teeth or rakes in such conveying or forwarding mechanism in such wise that same are capable of being moved into position and out of position to act on the crop material at the desired moment in the travel of such rakes or rake-teeth.

For the sake of example I have illustrated my said invention as applied on a harvesting-machine and on a swath-turning machine, and I have selected these two machines as types only of the many machines to which my invention is applicable. In said harvesting-machine the crop material is conveyed from the point at which it is gathered to the point at which it is discharged by a series of rakes or forks or rake-teeth which are so mounted and connected together on chains or belts as to form an endless conveyer, and by my invention I cause said rakes or forks or rake-teeth to vary their position and angle relatively to said material and to assume that position and angle most favorable for the purpose, whether at the moment of gathering, conveying, or discharging said material, and similarly in the case of the other applications of my said invention.

Figure 6:
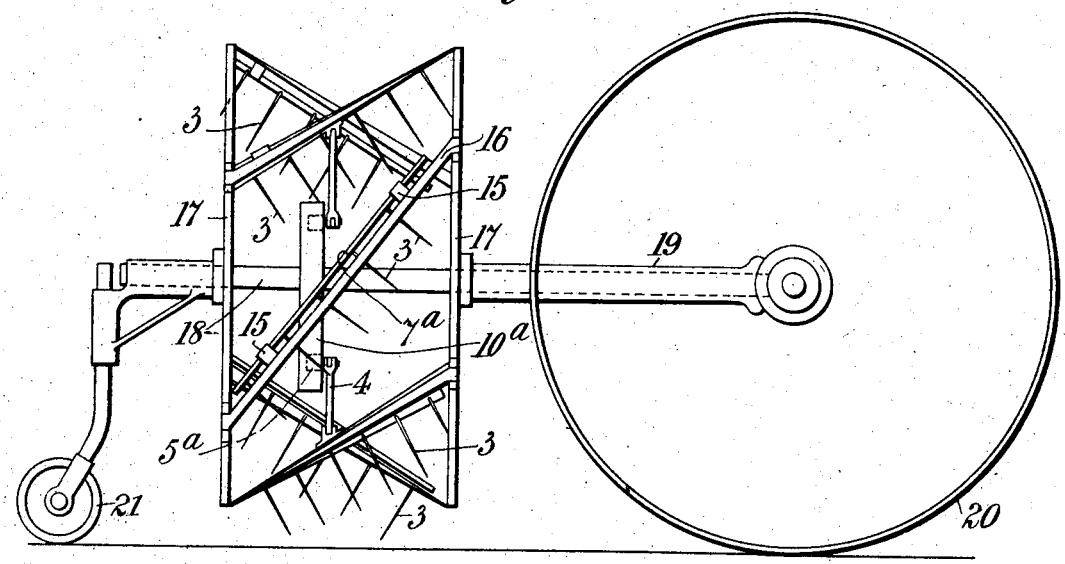
Figure 7:
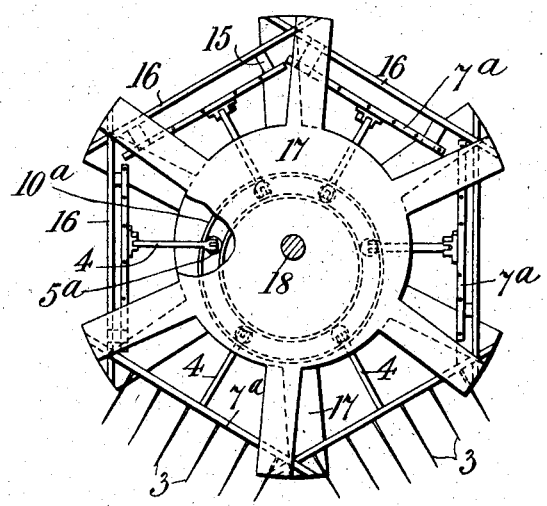

Referring to the drawings, Figure 1ª is a side elevation and illustrates one form in which my invention may be applied to a harvesting-machine. Fig. 1 is a longitudinal sectional elevation on line A B, Fig. 2. Fig. 2 is a plan. Fig. 3 is an end elevation; and Fig. 4 is a detailed view on an enlarged scale, as hereinafter explained, and together illustrate a modification in the application of my invention to a harvesting-machine. Fig. 5 illustrates a further slight modification. Figs. 6 and 7 are side and end views and show a convenient manner of applying my invention to a swath-turning machine or the like.

In Fig. 1ª, $a\ a$ are a pair of sprocket-chains working over and engaging with (so as to form two endless chains) two pairs of sprocket-wheels $b\ b$. These two endless chains are spaced any convenient distance apart and are connected together at right angles to their path of travel by a series of cross-bars $c\ c$ in such a way as to permit of the latter following round with the chains. To each of these cross-bars are fixed two or more bearing-pieces $d\ d$, and hinged thereon are short arms or bracket-pieces $e\ e$. Connecting each group of these short arms together are a series of rake-bars $f\ f$ with rake teeth or forks $g\ g$ projecting therefrom at substantially right angles thereto.

By any convenient spring attachment between the cross-bars $c\ c$ and the arms $e\ e$ it will be readily seen that these arms $e\ e$ can be made to depend from the chains at a right angle or such other angle as may be desired. In the embodiment shown the arms $e$ are normally held at right angles to the chains by means of springs $e^{\times}$. $h$ is a guide-bar affixed longitudinally between the two pairs of chains and extending the whole length of the same on the underneath side and having upwardly-curved ends so as to follow a portion of the path of the chain, as illustrated. $i\ i$ represent a false bottom and is composed of a series of longitudinal strips or laths with curved-up ends and is for the purpose of keeping the crop material in its proper position, as more fully described with reference to Figs. 1 and 2. $j\ j$ is the bottom plate, which extends under the whole area of the chains, rakes, &c., and upon which the material is delivered from the harvesting-machine. The path of travel of above-described rakes as same are caused to travel round and round by said sprocket-chains is such as to bring said rakes up to a position sufficiently close to the knives or cutters that as the crop is cut thereby said cut material will fall upon the traveling rakes and be gathered in by same. Except when the rakes are under the control of the guide-bar $h$ their position is, as shown in Fig. 1ª, on the upper part of the chain, wherein the teeth $g\ g$ are thrown back inside the path of travel of the chain. As they approach that end of the machine at which the crop material has been deposited on the bottom plate the rake-bars $f\ f$ strike against the curved guide-bar $h$ (which is prolonged sufficiently for this purpose) and following the curve of this guide-bar compel the hinged arms e e to fold up in line with the chains a a, thus causing the rake-teeth to project to their full extent outside the path of travel of the chains. This position is maintained by continuing contact with the guide-bar until the point is reached at which it is desired to release the crop material. At this point h' the guide-bar terminates, and the rake-arm relieved from control of said guide-bar is withdrawn from the crop material by the action of the spring $e^x$ on the arm-piece e, as before described.

In the arrangement illustrated by Figs. 1 to 5, 1 1 represent the sprocket-wheels, and 2 2 are the chains working on same. 3 3 3 are the rake-teeth. 4 4 4 are links or coupling-rods by which the motion of the chains is imparted to the rakes. 5 5 5 and 6 6 6 are rollers controlling the path of the rakes. 7 7 are the bars upon which the rakes are mounted. 8 8 8 are cross-bars extending from chain 2 to chain 2 and secured to same in such a way as to follow round with them. 9 9 are the two shafts running in bearings, each carrying a pair of sprocket-wheels. One of these shafts receives motion from the traction of the harvesting-machine in any convenient manner and by means of the chains and chain-wheels imparts motion to the other shaft. 10 10 is a continuous guide-bar frame or track which is secured by brackets $11^a$ to the cross-carrier bars 11 11, which are attached to the harvesting-machine itself, which latter also supports the whole of the mechanism of the rakes, chains, and side frames, &c., in any suitable manner. 12 12 represent a series of strips or laths interspaced between the rake-teeth 3 through which these project. They are curved up toward their ends and together form a sort of false bottom and are for the purpose of keeping the material being dealt with in its proper place—viz., between it and the bottom plate 13, (of the harvesting-machine,) which extends under the whole area of the chains, forks, &c., upon which the material is delivered from the knives or cutters, which may be advantageously located just in advance of and in about the same plane as said bottom plate 13. The guide-frame 10 is composed of a top and bottom member spaced apart and united together by half-circular ends, so as to form a continuous and uninterrupted track or guide along each edge for the rollers 5 5 5 and 6 6 6, the former being the exterior and the latter the interior rollers with respect to the track. For the purpose of clearing the supports of the guide-bar 10 the rollers 6 6 are shown as two short stud-rollers instead of one longer one, as 5, as shown in Fig. 4. The guide-bar frame 10 is so fixed in relation to the sprocket-wheels and chains that though their respective horizontal paths are parallel, yet by reason of the centers of the ends of said frames being set below the centers of the sprocket-wheels the lower member of the guide-frame is closer to the under side of the sprocket-chain than is the top member to the upper side of said chain. Consequently the semicircular ends of the guide-frame furnish a path eccentric to the track of the chains, as shown in Fig. 1. From this it follows that the rake-teeth 3 being set by the rollers and coupling-rod to project the full working depth required, while on the lower side will be forced to advance to and recede from that position as they approach to or depart from their lower horizontal track. Thus at the descending end part Y of the track 10, as the teeth 3 of the rakes advance into operative positions the exterior roller 5, following the eccentricity of the guide 10, will ultimately force the pivoted coupling bars or arms 4 4 to lie flat with the chain, and so cause the teeth 3 3 of the rakes to reach their maximum projection, which they will maintain until they begin to ascend on the opposite or releasing part Z of the track, when the interior roller, following the track of the guide-bar 10, will cause the teeth 3 3 of the rakes or forks to recede from and eventually retire altogether within the conveyer chain or belt.

Fig. 5 shows another slight modification of the apparatus I have been describing. Instead of the cross-bars 8 8 in Figs. 3 and 4, which extend from chain to chain, I have only shown inwardly-extending studs or brackets $8^a$ $8^a$, to which the coupling rods or links are attached, as before described.

Figs. 6 and 7 show my invention as applied to a swath-turning or hay-making machine, where only rotary and no horizontal conveying is required. In these figures, $10^a$ represents the eccentric guide-bar, and the track thereof is a circular and slotted one in which the rollers $5^a$ slide or revolve around. 4 4 are the links or coupling-rods, as described before, connecting the rakes 3 3 on the rake-bars $7^a$, which bars are pivoted on their ends and free to rotate in the bearings 15 15, provided in or on the diagonal bars 16, which bars are secured to the arms of the side frames 17 17. The rake-bars for the purpose of the better dealing with the material are shown set alternately at cross-angles. The eccentric guide $10^a$ remains stationary on the shaft 18, and motion is imparted to the side frames 17 17 through the sleeve 19 from the traction of the machine itself in any convenient manner. 20 is one of the main driving or ground wheels, and 21 is the pivoted or guiding wheel of the swath-turning or hay-making machine.

What I claim is—

1. In a conveyer for harvesters and the like, the combination, with a plurality of rake elements guided in an endless path, of arms or brackets fixed to said elements and movable to project inwardly or outwardly from the path of said elements, and a guide for said arms arranged eccentrically with respect to the path of all said elements.

2. In a conveyer such as described, a plurality of rakes, means for moving the same in an endless path embodying arms flexibly connected to the same, rollers fixed to said arms, and an endless guide for said rollers arranged eccentrically with respect to the path of all said rakes.

3. In a conveyer for harvesters and the like, in combination, a plurality of rotary sprockets arranged in parallel pairs, endless chains movable on said sprockets, cross-strips connecting said chains at intervals, brackets or arms flexibly attached to said cross-strips, rakes carried by said arms, and a track arranged eccentrically with respect to the travel of said chains and by means of which said arms are guided.

4. In a conveyer for harvesters and the like, in combination, a plurality of rotary sprockets arranged in parallel pairs, endless chains movable over said sprockets, cross-strips connecting said chains at intervals, arms pivoted to said cross-strips, rakes carried by said arms at their free ends, an endless track arranged eccentrically to the path of movement of said chains, and rollers carried by each arm and rolling on opposite surfaces of said track.

In witness whereof I have hereunto set my hand in presence of two witnesses.

DAVID CAVE.

Witnesses:
   ALBERT E. HOLIDAY,
   FRED. P. THORNTON.